United States Patent
Burkhardt et al.

(10) Patent No.: US 6,854,053 B2
(45) Date of Patent: Feb. 8, 2005

(54) METHOD FOR IDENTIFYING AND COMMUNICATING WITH A PLURALITY OF SLAVES IN A MASTER-SLAVE SYSTEM

(75) Inventors: Gert H. Burkhardt, Pasadena, CA (US); Craig Stephen Trommler, Romoland, CA (US); Ronald John Yates, Long Beach, CA (US); Albert Hai Zhou, La Puente, CA (US)

(73) Assignee: Signet Scientific Company, ElMonte, CA (US)

( * ) Notice: Subject to any disclaimer, the term of this patent is extended or adjusted under 35 U.S.C. 154(b) by 657 days.

(21) Appl. No.: 09/848,011

(22) Filed: May 2, 2001

(65) Prior Publication Data

US 2002/0049822 A1 Apr. 25, 2002

Related U.S. Application Data

(60) Provisional application No. 60/243,059, filed on Oct. 25, 2000.

(51) Int. Cl.[7] .......................... G06F 13/10; G06F 13/20; G06F 12/00
(52) U.S. Cl. ............................ 713/2; 709/208; 709/239; 370/457; 370/465; 370/475; 340/825.52
(58) Field of Search .............................. 713/2; 709/208, 709/239; 370/457, 465, 475; 340/825.52

(56) References Cited

U.S. PATENT DOCUMENTS

| 5,210,846 | A | | 5/1993 | Lee ............................ 395/425 |
|---|---|---|---|---|
| 5,398,326 | A | | 3/1995 | Lee ............................ 395/425 |
| 5,768,277 | A | * | 6/1998 | Ohno et al. .................. 370/457 |
| 6,108,751 | A | | 8/2000 | Lee et al. ..................... 711/115 |
| 6,299,364 | B1 | * | 10/2001 | Maruta et al. ................. 400/76 |
| 6,570,507 | B1 | * | 5/2003 | Lee et al. ............... 340/825.22 |

FOREIGN PATENT DOCUMENTS

JP  405257854 A  * 10/1993  ........... G06F/13/00

* cited by examiner

Primary Examiner—Rehana Perveen
(74) Attorney, Agent, or Firm—Sheppard, Mullin, Richter & Hampton LLP

(57) ABSTRACT

A method of identifying a plurality of slave processors using a master processor is provided which includes assigning a unique identification code to each of the plurality of slave processors, and transmitting an attention command from the master processor to the plurality of slave processors. The master processor then transmits a request for the slaves' unique identification code to the plurality of slave processors. The master processor then determines whether one of the plurality of slave processors unique identification code matches the classification characters. If there are no matches, a last added classification character is incremented by 1. If only one matches, the master processor identifies the one of the plurality of slave processors, and removes a last added classification character. Otherwise, if more than one matches, the master processor adds a new classification character, and sets a last added classification character to a minimum identification code character value.

21 Claims, 6 Drawing Sheets

|  | Bit 0 | Bit 1 | Bit 2 | Bit 3 | Bit 4 | Bit 5 | Bit 6 | Bit 7 | Parity |
|---|---|---|---|---|---|---|---|---|---|
| character 1 |  |  |  |  |  |  |  |  |  |
| character 2 |  |  |  |  |  |  |  |  |  |
| character 3 |  |  |  |  |  |  |  |  |  |
| character 4 |  |  |  |  |  |  |  |  |  |
| character 5 |  |  |  |  |  |  |  |  |  |
| character 6 |  |  |  |  |  |  |  |  |  |
| character 7 |  |  |  |  |  |  |  |  |  |
| character 8 |  |  |  |  |  |  |  |  |  |
| character 9 |  |  |  |  |  |  |  |  |  |
| character 10 |  |  |  |  |  |  |  |  |  |

METHOD FOR IDENTIFYING AND COMMUNICATING WITH A PLURALITY OF SLAVES IN A MASTER-SLAVE SYSTEM

CROSS-REFERENCE TO RELATED APPLICATION

This application claims priority from U.S. provisional patent application Ser. No. 60/243,059, filed Oct. 25, 2000, which is herein incorporated by reference for all purposes.

BACKGROUND OF THE INVENTION

1. Field of the Invention

The present invention relates generally to a method for identifying slave processors using a master processor and, more particularly, for identifying and communicating with a plurality of slaves in a master-slave system.

2. Description of the Related Art

Various instruments have been developed to measure the flow rate, pH, conductivity, and temperature of a fluid. These measurement instruments typically include a sensor that is attached to a conduit carrying the fluid. The sensor measures the temperature, for example, and transmits an analog or digital signal, representing the temperature, to a receiver. The receiver receives the signal, sends the analog signal to an analog-to-digital converter, which converts the signal to a digital temperature value. The temperature data is then sent to a computer, which receives, evaluates, and displays the data. Depending on the data received, the computer might also transmit a signal back to the instrument to adjust or control the operation of the instrument. A computer might also be located within the instrument to perform certain functions and to receive, evaluate, and display the results. Such microprocessors, computational circuits, and computers will be referred to hereinafter as "processors."

In designs where the system has a first processor that controls the instrument and a second processor that controls the first processor, the first processor is referred to as a "slave" processor and the second processor is referred to as a "master" processor. The master processor might include a computer, microprocessor, data processing unit, process controller, programmable logic controller, receiver, transmitter, or a combination of these devices. The slave processor likewise might include a computer, microprocessor, data processing unit, process controller, programmable logic controller, digital-to-analog converter, circuit, transistor, flow meter, indicator, receiver, transmitter, sensor, actuator, solenoid valve, measurement equipment, measurement instrument, or a combination of these devices.

FIG. 1 depicts a simplified block diagram of a master-slave system 10, which includes a master processor 12, up to 64 slave processors 14, and a data bus 16 that connects the master processor to the slave processors. The master and slave processors all include a universal asynchronous receiver and transmitter (UART) 18, for transmitting and receiving data. The UART can be realized in hardware, software or a combination of the two. The master and slave processors are configured to pull down, i.e., sink, the data bus. The master processor also includes a pull-up resistor, e.g., 1 kohm, connected to a power supply V, e.g., 5 volts.

The data bus 16 is an asymmetrical two-wire asynchronous half-duplex communication link that operates on a binary level, i.e., low/high signal. A third wire provides power to each of the plurality of slave processors. Power (e.g., 5 volts±0.5 volts) is provided to the third wire by the master processor or a separate power supply. The data bus ground and the power supply ground might be connected to or integral with a cable shield or can be separate from the cable shield depending on the noise conditions. The master-slave system transmits data with active high signals, which are typically logic "1" signals represented by a voltage greater than the systems minimum high level.

When the plurality of slave processors 14 are connected to the data bus 16, it is often desirable to identify and communicate with each slave processor that is connected to the master processor in a simple and efficient manner. One method involves assigning each slave processor a unique ten (10) digit identification code at the time of manufacture of the slave processor. This identification code is permanently stored in the slave processor's memory. The master-slave communication is accomplished by having the master processor 12 transmit a command and a particular slave's unique 10 digit identification code to all of the slave processors. Then, only the slave processor with the matching identification code will respond to the master processor. Hence, the master processor must know all of the slave processors' identification code in their entirety prior to any master-slave communication.

Several other methods have also been developed to perform master-slave communication; however, these methods are considered to be complicated and inefficient. Such methods are described in U.S. Pat. No. 5,210,846 issued on May 11, 1993, U.S. Pat. No. 5,398,326 issued on Mar. 14, 1995, and U.S. Pat. No. 6,108,751 issued on Aug. 22, 2000.

It should therefore be appreciated that there is a need for a method of identifying and communicating with each slave processor in a master-slave system in a simple and efficient manner. The present invention fulfills this need as well as others.

SUMMARY OF THE INVENTION

A method of identifying a plurality of slave processors using a master processor is provided which includes assigning a unique identification code to each of the plurality of slave processors, and transmitting an attention command from the master processor to the plurality of slave processors. The attention command is typically sent before any command is sent from the master processor to a slave processor. The master processor then transmits a request for the slaves' unique identification code to the plurality of slave processors. The request might include an attention command, a request slave identity command, and one or more classification characters. The master processor then determines whether one of the plurality of slave processors unique identification code matches the classification characters. If there are no matches, then a last added classification character is incremented by 1. If only one slave processor's identification code matches, then the master processor identifies the one of the plurality of slave processors, and removes a last added classification character. Otherwise, if more than one slave processor's identification code matches, then the master processor adds a new classification character, and sets a last added classification character to a minimum identification code character value. The steps subsequent to transmitting the first attention command are repeated until the plurality of slave processors have been identified.

Advantages of the present invention include identifying and communicating with each slave in a master-slave system in a simple and efficient manner. Another advantage is assigning a short address to each slave in a master-slave system.

Other features and advantages of the invention should become apparent from the following description of the preferred embodiment, taken in conjunction with the accompanying drawings, which illustrate, by way of example, the principles of the invention.

BRIEF DESCRIPTION OF THE DRAWINGS

Embodiments of the present invention will now be described, by way of example only, with reference to the following drawings in which.

DESCRIPTION OF THE PREFERRED EMBODIMENT

The present invention provides a method for a master processor to identify and communicate with a plurality of slave processors. In the master-slave system of the present invention, the master processor transmits data to and receives data from each of the plurality of slave processors using a method that eliminates the collision of data which occurs when more than one slave processor is transmitting data to the master processor at a particular time. The master processor also identifies each slave processor so that the master processor can accurately receive the correct data that each slave processor has transmitted and transmit data and requests for information to the correct slave processor. Furthermore, the master processor can receive data from a plurality of slave processors in a simple, efficient, and systematic manner such that the data from each slave processor can be transmitted via the data bus to the master processor without any collisions or loss of data. Therefore, the present invention provides a method for identifying and communicating with each of the plurality of slave processors in the master-slave system in a simple, efficient, and systematic manner.

Figure 1:
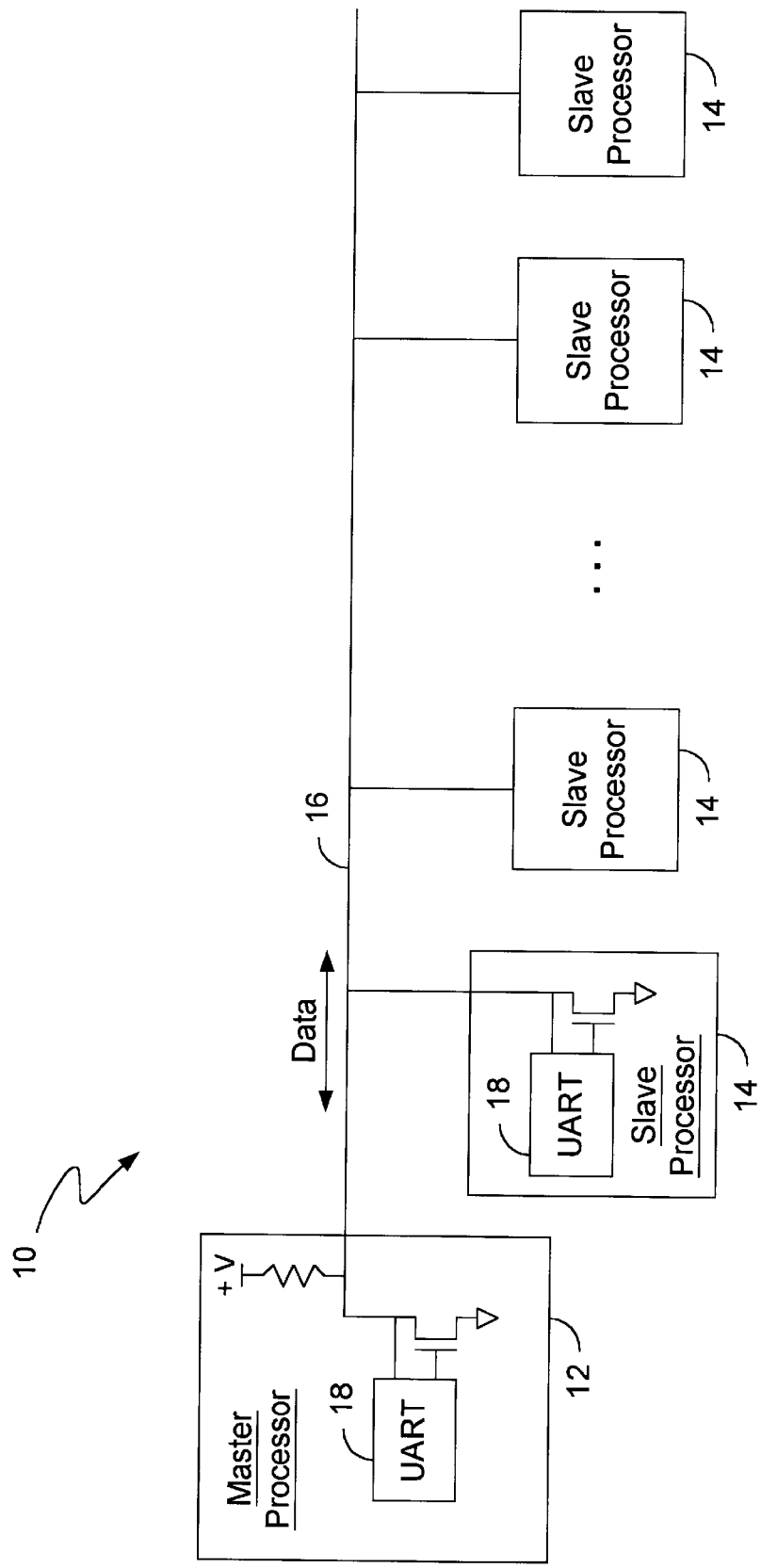
FIG. 1 depicts a simplified block diagram of a master-slave system, which includes a master processor, up to 64 slave processors, and a data bus.
Figure 2A:
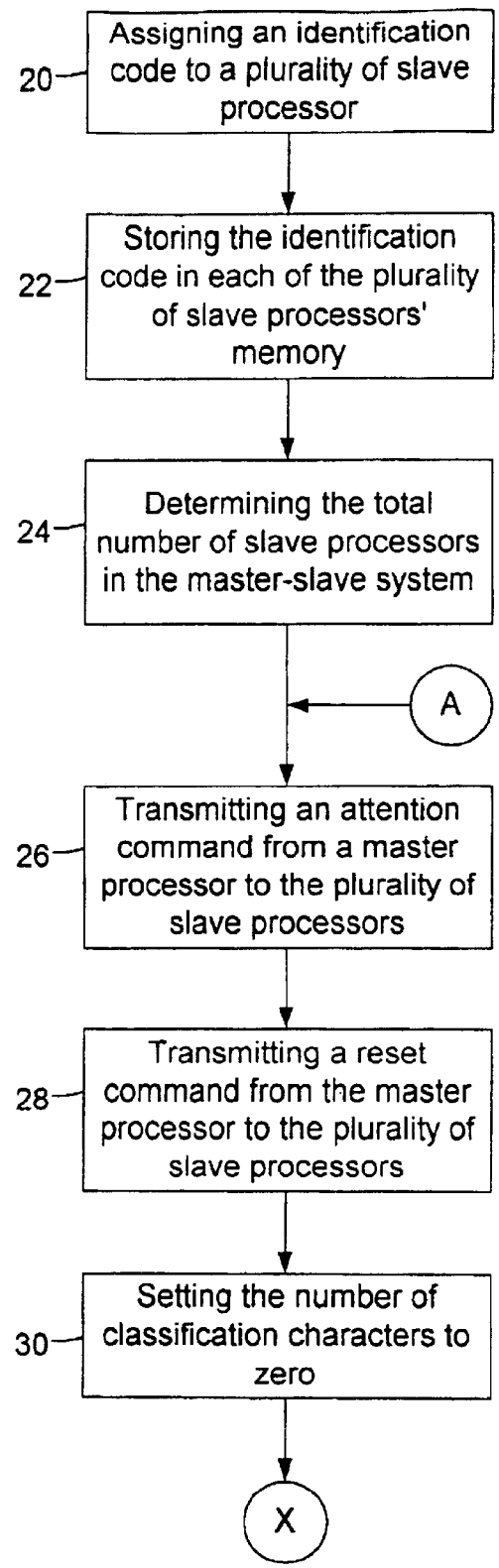
FIG. 2A is a first portion of a flowchart depicting a method for identifying and communication with a plurality of slave processors in a master-slave system.
Figure 2B:
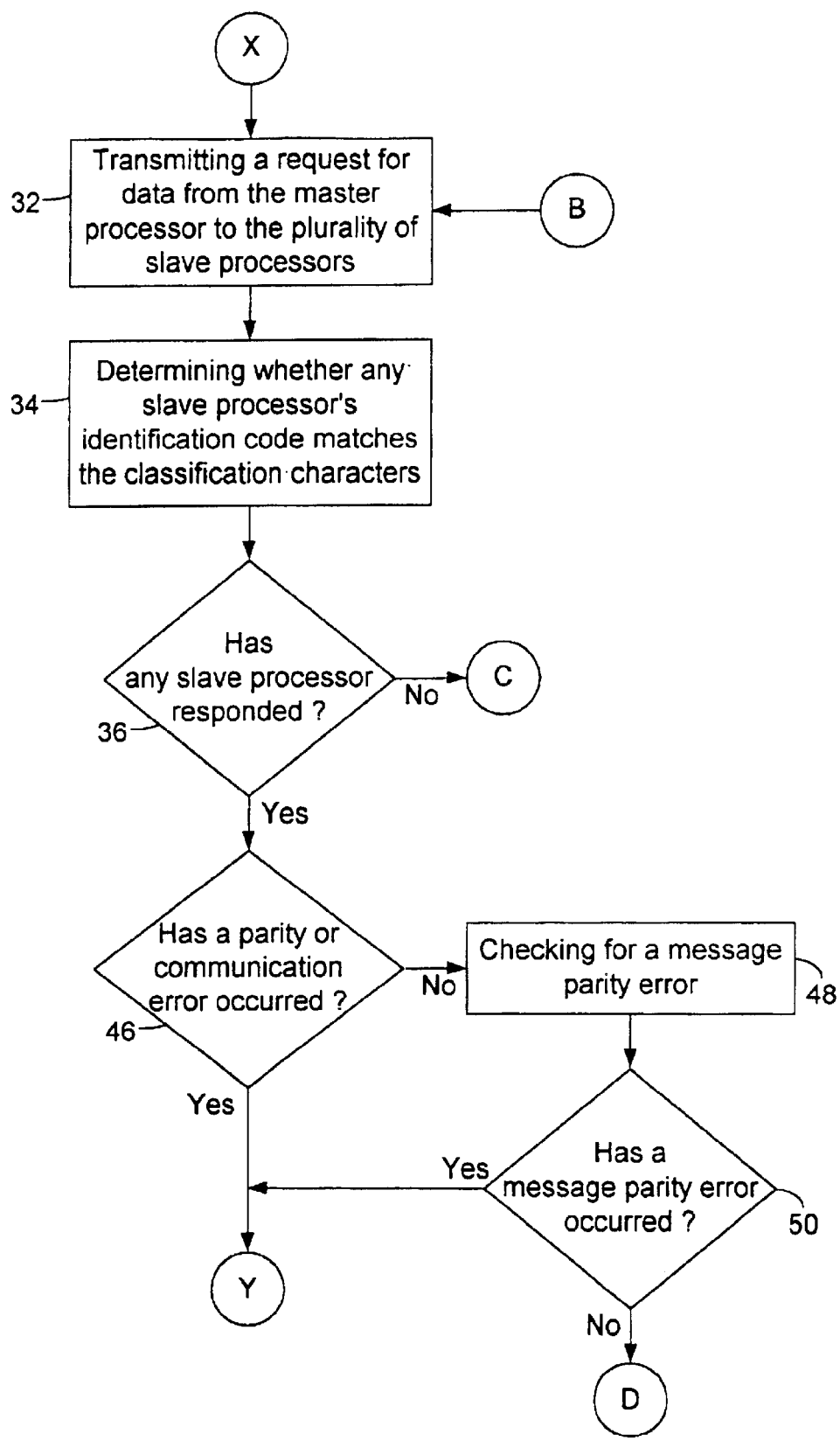
FIG. 2B is a second portion of a flowchart depicting a method for identifying and communication with a plurality of slave processors in a master-slave system.
Figure 2C:
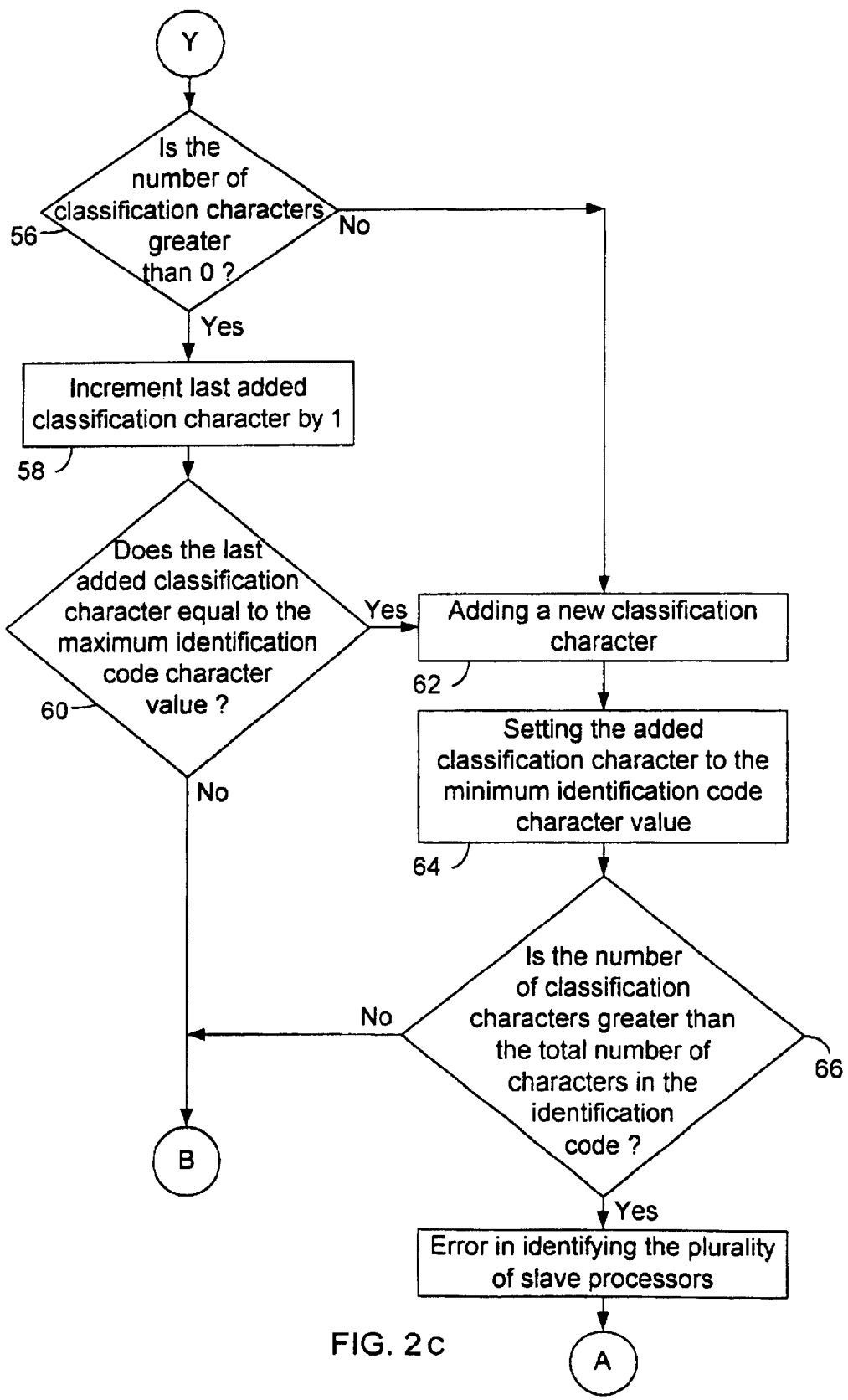
FIG. 2C is a third portion of a flowchart depicting a method for identifying and communication with a plurality of slave processors in a master-slave system.
Figure 2D:
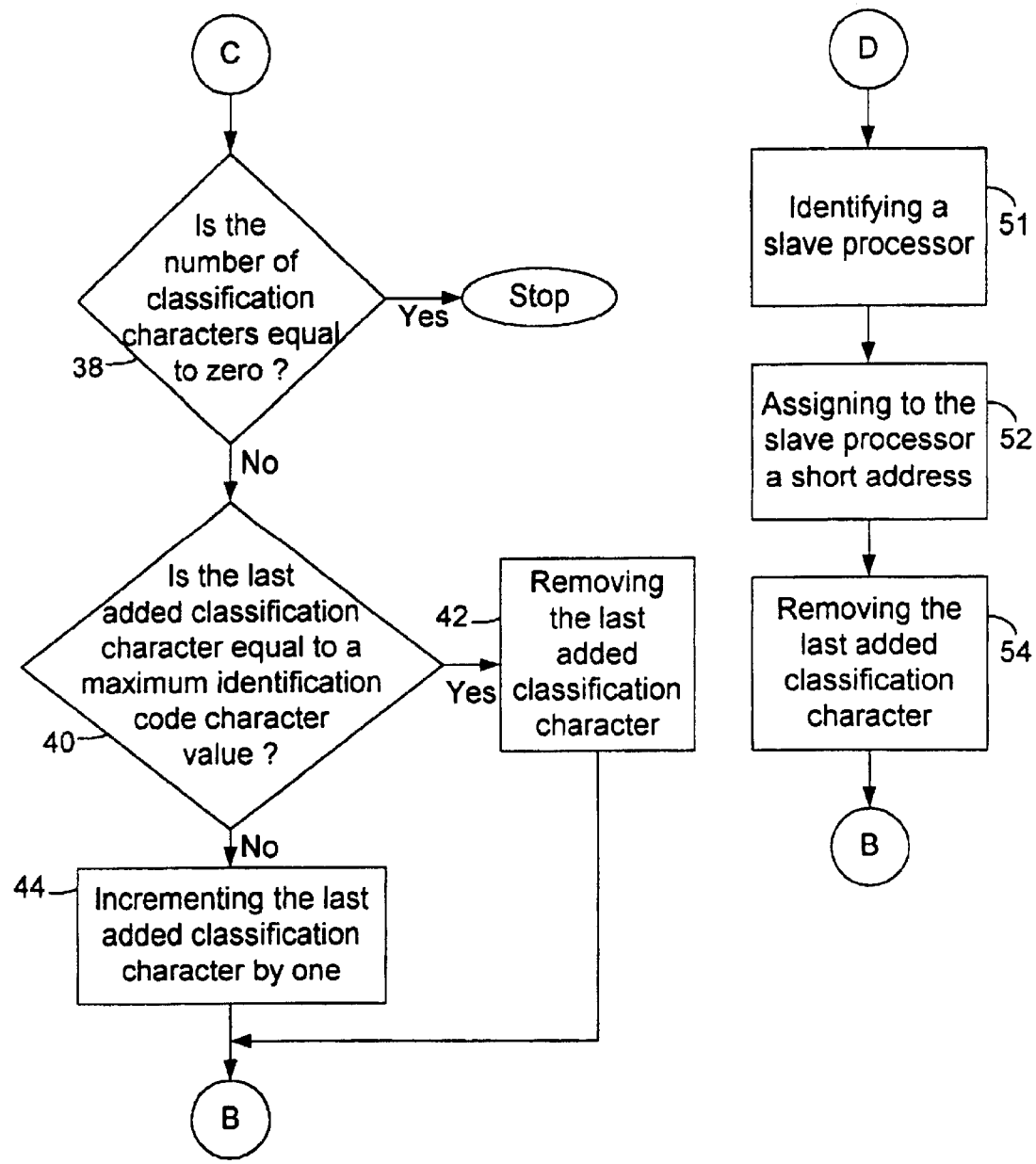
FIG. 2D is a third portion of a flowchart depicting a method for identifying and communication with a plurality of slave processors in a master-slave system.

With reference now to the illustrative drawings, and particularly to FIG. 2, there is shown a flowchart depicting a method for identifying and communication with a plurality of slave processors in a master-slave system. For purposes of illustration, the method of the present invention is implemented using the master-slave system of FIG. 1. One of ordinary skill in the art will be able to implement the method of the present invention on any master-slave or similar system.

The method of identifying and communicating with up to 64 slave processors starts at step 20 when each slave processor 14 is assigned a unique identification code, which is preferably a ten character part number or serial number of the slave processor, which might include a date code. The date code is a six digit number that indicates the date the slave processor was manufactured. For example, the identification code might be 9905221234. The identification code is stored on an electronically-erasable programable read only memory (EEPROM) chip associated with each slave processor (step 22). Each slave can be assigned a short address (discussed below), which can be stored as a one-byte address in random-access memory (RAM), for faster access and addressing. If the short address is stored in RAM, once the slave processor is shut-down, the RAM is reset and reassigned during power-up or reset of each of the plurality of slave processors.

After power-up or reset of the slave processors 14, a user of the master-slave system might determine, e.g., count, the total number of slave processors 14 connected to the master processor and input this number into the master processor (step 24). A user might also set a maximum identification code character value to a value that represents the greatest character value used by any of the slave processors. Similarly, a user might also set a minimum identification code character value to a value that represents the smallest character value used by any of the slave processors. For example, using the identification code above, the minimum identification code character value is 0 and the maximum identification code character value is 9. Alternatively, the master processor 12 can be pre-configured to store the minimum and maximum identification code character values.

The master processor 12 identifies each slave processor 14 that is connected to the data bus 16. This involves the master processor remaining silent, i.e., not issuing any commands to any of the slave processors, for a wait period of approximately ten (10) milliseconds or less, which allows the data bus to be pulled high, i.e., settle to a high state, by the power supply V. The wait period is so that the plurality of slave processors can use more economical circuitry and processing features. Thereafter, the master processor issues or transmits an attention command to each of the slave processors connected to the data bus (step 26). The attention command is preferably a printable character, e.g., a $ (hex 24) character, that is used to notify each slave processor that another command or data is to follow. The attention command is typically followed by a reset command (step 28), preferably !RST (hex 21,52,53,54), which resets each slave processor's memory which might have stored a previously assigned short address (discussed below). Resetting each slave processor's memory ensures that no two slave processors will be assigned to the same short address. The master processor generally transmits the reset command to the plurality of slave processors within a predetermined time interval, i.e., preferably 50 milliseconds, more preferably 100 milliseconds, and most preferably less than one second, after the attention command is transmitted. The master processor might send the attention and reset commands as one continuous set of characters. More generally, the time delay between any two data operations, e.g., two characters or a command and a character, that the master processor issues or transmits, is the predetermined time interval. If the slave processor does not receive data, e.g., a command, within the predetermined time interval, the slave processor times out and considers the transmission invalid. On the other hand, once the slave processor receives a message end character, preferably a return character ↵ (hex 0D), the timer for that particular slave processor is reset. The master processor also sets the number of classification characters to zero (step 30).

Once the master processor 12 transmits the reset command, the master processor transmits a request for data, e.g., the attention command followed by a request slave identity command (#) (hex 23), the classification characters (if any), and the message end character, to each of the slave processors 14 (step 32). That is, the request for data is a sequence of printable characters such as $#↵. The request slave identity command (#) instructs each slave processor having the same classification characters as identified in the request for data, to send data, e.g., its identification code, to the master processor. The classification characters are preferably a sequence of characters, e.g., "xxxx", of varying length. Each classification character ranges from 0 to 9, and typically starts at 0 and is incremented by 1. The total number of classification characters cannot be greater than the total number of characters in the identification code, e.g., ten characters. Initially, the number of classification characters is set to zero, and is typically increased and decreased by 1. If no classification characters are identified in the request for data, all the slave processors 14 are requested to return data, e.g., its identification code. The message end character (↵) indicates the end of the data and notifies the slave processors that the master processor is waiting for a response from at least one of the slave processors.

Upon receipt of the message end character (↵), each slave processor determines whether its identification code matches the classification characters in the request for data (step 34). For example, if the classification characters transmitted are 74, then the slave processor(s) whose identification code begins with a 74 will produces a match. Each slave processor that produces a match has preferably less than one second, more preferably 50 milliseconds, and most preferably 20 milliseconds, to respond to the master processor's request for data, otherwise the master processor times out and considers the transmission invalid (step 36).

If no slave processor 14 responds, the master processor 12 determines if the number of classification characters is equal to zero (step 38). If the number of classification characters equals zero, then there are no slave processors connected to the master processor or there are no additional slave processors that have been connected to the master processor. Hence, the master processor does not process any more data operations.

At step 40, the master processor 12 determines whether the last classification character added is equal to the maximum identification code value. If it is, the master processor discards or removes the last added classification character (step 42) and decrements by 1 the number of classification characters. Otherwise, the master processor increments the last added classification character by 1 (step 44).

Figures 3, 4:
FIG. 3 depicts a seven bit serial UART data format that is used to transmit data, e.g., each character, to the master processor and to receive data from the master processor.
FIG. 4 illustrates a simplified representation of an identification code with byte and message parity bits added.

If one or more slave processors 14 respond during the response time interval, each slave processor that responds, might respond by sending its identification code to the master processor 12 (step 36), which preferably involves sending the least significant character of the identification code first. FIG. 3 depicts a seven bit serial UART data format that is used to transmit and receive data, e.g., each character, to and from the master processor. Each character transmitted has one start bit, seven data bits, one parity bit, and two stop bits. The start and stop bits are preferably active low signals. Each slave processor also sends two characters representing the version of the slave processor, e.g., "1" and "5" for version 1.5, and two parity characters for message parity (discussed below).

Adding a parity bit to each byte in a transmission is a common error detection technique (typically referred to as byte parity). Depending on whether the master-slave system is configured for even or odd parity, the parity bit will be either a 0 or a 1. For example, if the master-slave system is configured for even parity, the parity bit will be added to make the total number of 1's in the byte even. Similarly, if the master-slave system is configured for odd parity, the parity bit will be added to make the total number of 1's in the byte odd.

In step 46, the master processor determines whether a parity error or communication error, e.g., a serial framing or overrun error, has occurred. If the master processor detects a parity or communication error, the master processor stops checking the remaining characters and waits for all the slave processors to time out. Otherwise, all ten characters, i.e., bytes, are checked for message parity (step 48), which is a parity checking technique that checks the accuracy of the entire data, e.g., one identification code. Message parity involves checking the ten characters of the identification code and comparing the results to the two parity characters (see also FIG. 4). Once a message parity error is detected, the master processor stop checking the remaining characters and waits for all the slave processors to time out (step 50). Using byte and message parity error detection techniques, the master processor is able to know whether an error in data transmission has occurred.

If no communication or parity error is detected, the data received is accurate and only one slave processor 14 is communicating with the master processor 12. Hence, the master processor has received the identification code of the slave processor it has established communicating with and has identified the slave processor by its identification code (step 51). The master processor then assigns the slave processor a short address, i.e., a nickname (step 52). To assign the slave processor 14 a short address, the following process might be used. First, the master processor 12 assigns each slave processor a number from 0 to 63 such that the first slave processor to be assigned is assigned a 0, the second slave processor to be assigned is assigned a 1, etc. The master processor then converts the 0 to an eight bit word and adds 40 (hex) to the number. This process maps four bits into eight bits representing printable characters, which are used for reading the data and for trouble shooting the master-slave system from a terminal. In one embodiment, an ASCII table can provide a list of printable characters for the short addresses. For example, 40 (hex) is short address @, 41 (hex) is short address A, etc. Therefore, the first slave processor might be assigned short address @, which is 40 (hex). Once the slave processor's short address is assigned or determined, the master processor transmits the attention command, an address command (e.g., %), the identification code, the short address, and two check characters to the first slave processor. For example, the master processor transmits #% 9905221234 40 00 to the first slave processor. As a confirmation, the slave processor that has been assigned a short address transmits back its identification code, its short address, and the two check characters. This allows the master processor to confirm that the slave processor has accurately received its short address, i.e., nickname. At step 54, the master processor discards or removes the last added classification character, and decrements by 1 the number of classification characters.

If a communication or parity error is detected, then more than one slave processor 14 transmitted its identification code to the master processor 12 and a data bus collision has occurred. If this occurs, after all the slave processors time out, the master processor determines if the number of classification characters is greater than 0 (step 56). If the number of classification characters equal to 0 then the method proceeds to step 62. Otherwise, the master processor increments the last classification character by 1 (step 58). At step 60, the master processor determines whether the last added classification character is equal to the maximum identification code character value. If they are not equal, then the method goes back to step 32. If they are equal, the master processor adds a new classification character (step 62) and increments by 1 the number of classification characters. At step 64, the new classification character is set to the minimum identification code character value. The master processor then determines whether the number of classification characters is greater than the total number of characters in the identification code (step 66). If the number is greater, then an error in identifying the plurality of slaves occurs and the method returns to step 26. Otherwise, the method returns to step 32.

This method continues until the master processor knows the identification code of each slave processor and each slave processor has been assigned a short address. The master processor might assign a short address to up to 64 slave processors.

Once short addresses are assigned to all of the plurality of slave processors 14, the master processor 12 can request data in three ways. First, the master processor can request data using a one device measurement command (e.g., >). For example, the master processor can transmit the $>↵ command and the slave processor connected to the master processor will return its last measurement, which will be formatted in the correct units. This command can only be used if there is only one slave processor. Second, the master processor can request data using a full measurement command, e.g., (, and the slave processor's identification code. For example, the master processor can transmit the $ ([identification code]↵ command and the slave processor identified by the identification code will return its last measurement. This command might be used when one or more of the slave processors power down during operation of the master-slave system. Third, the master processor can request data using the short address of a particular slave processor. For example, the master processor can transmit the $@↵ command and the slave processor identified by the short address @ will return its last measurement. Each measurement value is typically transmitted in a seven byte data format along with two check characters and the message end character. An extended measurement command, e.g., +, preceding any command, allows the master processor to request complete measurements based on the slave processor. For example, a $+@ series of commands, instructs the slave processor having an @ short address to respond to the master processor with all its measurements, e.g., pH, mV, and temperature.

The master processor 12 can also request detailed data from each slave processor 14 by using a question command (?). The detailed data received from each of the slave processors is used to calibrate the master-slave system. The master processor might send the following command: $? [ten character identification code] [two check characters] ↵ to receive detailed data. The slave processor identified by the identification code responds to the master processor with the following detailed data: slave type name, start up time (preferably in milliseconds), update time between measurements (preferably in milliseconds), unit of measure(s), parity character 1, parity character 2, and carriage return. For example, the start up time might represent the time it takes for that particular slave processor to be ready to measure accurately when powered up with a high signal, e.g., 5 volts.

Also, the update time between measurements might represent the time interval between each measurement. The unit of measure might be pH, degrees C., psi, meters, liters, etc. The master processor might receive the following detailed data from a slave processor: a 2450 pressure sensor, 5, 30, 11, 1, 0 ↵.

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. A method of identifying a plurality of slave processors using a master processor, comprising:
    assigning a unique identification code to each of the plurality of slave processors;
    transmitting a first attention command from the master processor to the plurality of slave processors;
    transmitting a request for data from the master processor to the plurality of slave processors, the request for data includes a second attention command, a request slave identity command, and one or more classification characters;
    determining whether one of the plurality of slave processors unique identification code matches the classification characters;
    if no matches,
        incrementing a last added classification character,
    if only one matches,
        identifying one of the plurality of slave processors, and
        removing a last added classification character;
    if more than one matches,
        adding a new classification character, and
        setting the new classification character to a minimum identification code character value; and
    repeating the steps subsequent to the transmitting the first attention command until the plurality of slave processors have been identified.

2. A method as defined in claim 1, further comprising storing the identification code in a memory that is part of each of the plurality of slave processors.

3. A method as defined in claim 1, further comprising transmitting a reset command from the master processor to the plurality of slave processors to reset each of the plurality of slave processors.

4. A method as defined in claim 3, wherein the reset command is transmitted immediately after the first attention command is transmitted to the plurality of slave processors.

5. A method as defined in claim 1, wherein the request slave identity command instructs each of the plurality of slave processors to transmit its identification code to the master processor.

6. A method as defined in claim 1, further comprising requesting measurement information from one of the plurality of slave processors by transmitting a question command and the unique identification code to the plurality of slave processors.

7. A method as defined in claim 1, wherein the unique identification code is a plurality of characters.

8. A method as defined in claim 1, further comprising requesting measurement information from one of the plurality of slave processors by transmitting a question command and the unique identification code to one of the plurality of slave processors.

9. A method as defined in claim 1, wherein one of the plurality of slave processors responds to the master processor by transmitting a range value to calibrate the master processor.

10. A method as defined in claim 1, further comprising setting a counter to represent a total number of classification characters.

11. A method of assigning a short address to a plurality of slave processors using a master processor, comprising:
assigning a unique identification code to each of the plurality of slave processors;
transmitting a first attention command from the master processor to the plurality of slave processors;
transmitting a request for data from the master processor to the plurality of slave processors, the request for data includes a second attention command, a request slave identity command, and one or more classification characters;
determining whether one of the plurality of slave processors unique identification code matches the classification characters;
if no matches,
incrementing a last added classification character,
if only one matches,
assigning a short address to the one of the plurality of slave processors, and
removing a last added classification character;
if more than one matches,
adding a new classification character, and
setting the new classification character to a minimum identification code character value; and
repeating the steps subsequent to the transmitting the first attention command until the plurality of slave processors have been assigned a short address.

12. A method as defined in claim 11, further comprising storing the identification code in a memory that is part of each of the plurality of slave processors.

13. A method as defined in claim 11, further comprising transmitting a reset command from the master processor to the plurality of slave processors to reset each of the plurality of slave processors.

14. A method as defined in claim 13, wherein the reset command is transmitted immediately after the first attention command is transmitted to the plurality of slave processors.

15. A method as defined in claim 11, wherein the request slave identity command instructs each of the plurality of slave processors to transmit its identification code to the master processor.

16. A method as defined in claim 11, further comprising requesting measurement information from one of the plurality of slave processors by transmitting a question command and the short address to the plurality of slave processors.

17. A method as defined in claim 11, wherein the short address is a single printable character.

18. A method as defied in claim 11, further comprising requesting measurement information from one of the plurality of slave processors by transmitting a question command and the identification code of one of the plurality of slave processors.

19. A method as defined in claim 11, wherein one of the plurality of slave processors responds to the master processor by transmitting a range value to calibrate the master processor.

20. A method as defined in claim 11, wherein assigning the short address to the one of the plurality of slave processors includes converting the short address to a printable character.

21. A method as defined in claim 11, wherein the short address is a printable character.

* * * * *